United States Patent [19]

Coverston et al.

[11] Patent Number: 5,504,883

[45] Date of Patent: Apr. 2, 1996

[54] METHOD AND APPARATUS FOR INSURING RECOVERY OF FILE CONTROL INFORMATION FOR SECONDARY STORAGE SYSTEMS

[75] Inventors: Harriet G. Coverston, New Brighton, Minn.; Donald D. Crouse, Murphy, Tex.

[73] Assignee: LSC, Inc., Arden Hills, Minn.

[21] Appl. No.: 12,030

[22] Filed: Feb. 1, 1993

[51] Int. Cl.$^6$ ............................. G06F 11/14; G06F 17/30
[52] U.S. Cl. ............. 395/600; 395/182.04; 364/222.81; 364/222.82; 364/243.41; 364/266.3; 364/266.5; 364/268.2; 364/268; 364/268.3; 364/268.9; 364/283.1; 364/285; 364/285.1; 364/285.2; 364/285.3; 364/285.4; 364/DIG. 1; 371/10.2; 371/21.1
[58] Field of Search ...................................... 395/600, 575, 395/182.04; 371/7, 10.1, 12, 13, 67.1, 10.2

[56] References Cited

U.S. PATENT DOCUMENTS

| | | | |
|---|---|---|---|
| 4,393,500 | 7/1983 | Imazeki et al. | 395/182.2 |
| 4,819,154 | 4/1989 | Stiffler et al. | 395/182.18 |
| 4,945,474 | 7/1990 | Elliott et al. | 395/182.14 |
| 5,138,710 | 8/1992 | Kruesi et al. | 395/182.13 |
| 5,175,839 | 12/1992 | Ikeda et al. | 395/410 |
| 5,233,618 | 8/1993 | Glider et al. | 371/68.1 |
| 5,381,545 | 1/1995 | Baker et al. | 395/182.17 |
| 5,455,942 | 10/1995 | Mohan et al. | 395/600 |

*Primary Examiner*—Thomas G. Black
*Assistant Examiner*—Jack M. Choules
*Attorney, Agent, or Firm*—Patterson & Keough

[57] ABSTRACT

A method and apparatus for backing up the control information of a file system to a secondary storage system provides for a fast and reliable recovery of the file system in the event of an unscheduled hard stop of a computer processing system. The file system utilizes control information that is maintained in a cache memory of the computer processing system and a copy of the control information is periodically backed up to a first and second logical device in the secondary storage system. As part of each backup, a control stamp value unique to each iteration of the backup is written to a pair of unique control stamp locations on the logical devices, one control stamp location being written prior to the back up of the control information and the other control stamp location being written after the backup of the control information. In the event of an unscheduled hard stop of the computer processing system, the control information for the file system is quickly and accurately recovered by determining which of the two copies of the control information is accurate based on a comparison of the control stamp values in all four control stamp locations.

14 Claims, 6 Drawing Sheets

METHOD AND APPARATUS FOR INSURING RECOVERY OF FILE CONTROL INFORMATION FOR SECONDARY STORAGE SYSTEMS

RELATED APPLICATION

This application is related to the following co-pending application, filed concurrently herewith and assigned to the same assignee, entitled ARCHIVING FILE SYSTEM FOR DATA SERVERS IN A DISTRIBUTED NETWORK ENVIRONMENT, Ser. No. 08/133,982, filed Feb. 1, 1993, a copy of which is attached hereto and the disclosure of which is hereby incorporated by reference.

TECHNICAL FIELD

The present invention relates generally to secondary storage systems, such as disk drives, tape drives and the like for computer processing systems. More particularly, the present invention relates to a method and apparatus that is part of a file system and allows for the reliable and efficient recovery of files stored on a secondary storage system in the event of an unscheduled hard stop of the computer processing system.

BACKGROUND ART

The use of secondary storage systems to provide for online storage for computer processing systems that is separate from the primary or main memory of the computer processing system is well known. Examples of current secondary storage systems include magnetic disk drives, optical disk drives, magnetic tape drives, solid state disk drives and bubble memories. Typically, secondary storage systems have much larger memory capacities than the primary memory of a computer processing system; however, the access to data stored on most secondary storage systems is sequential, not random, and the access rates for secondary storage systems can be significantly slower than the access rate for primary memory. As a result, individual bytes of data or characters of information are usually stored in a secondary storage system as part of a larger collective group of data known as a file.

Generally, files are stored in accordance with one or more predefined file structures that dictate exactly how the information in the file will be stored and accessed in the secondary storage system. In most computer processing systems, the operating system program will have a file control program that includes a group of standard routines to perform certain common functions with respect to reading, writing, updating and maintaining the files as they are stored on the secondary storage system in accordance with the predefined file structure that organizes the storage of both control information and data information. As used within the present invention, the term file system will refer collectively to the file structure and file control program.

One of the problems with secondary storage systems is how to insure the integrity of files stored on the secondary storage system in the event of an unscheduled hard stop of the computer processing system. An unscheduled hard stop occurs, for example, when a power failure causes a system crash or when the computer processing system must be powered down due to an unexpected reset. The problem of file integrity arises because of the access latency between the time that a user program issues an update request for a file, for example, and the time that the data for the file and the control structure for the file are actually written to the secondary storage device. If an unscheduled hard stop of the computer processing system occurs any time during this access latency window, the validity of the data stored in that file is called into question. Depending upon exactly when the unscheduled hard stop occurs during a file access, the file as stored on the secondary storage system may reflect the file as it existed prior to the update request, after completion of the update request, or in some state of partial completion of the update request. In the event that the hard stop occurs during the updating of the control information for the file structure, it is also possible that the control information for that file, or even the control information for that file tree pointing to any number of files stored on the secondary storage system may have been corrupted as a result of the unscheduled hard stop.

The traditional mechanism for insuring data integrity in the event of an unscheduled hard stop is to maintain a transaction log of all database files, for example, as described in U.S. Pat. Nos. 5,095,421, 4,945,474 and 4,530,054. In the data recovery system described in U.S. Pat. No. 4,530,054, for example, a time stamp is generated with each write command as a mechanism to log data transactions between cache memory and the bulk memory of the secondary storage devices. The primary problems with maintaining a transaction log are that recovery of the file system can be a complicated and lengthy process for file systems having a large number of files or records, and that the transaction log may not provide protection against corruption of the control information for the file system.

The other common technique for insuring data integrity is to provide a redundant, fault-tolerant system using hardware, as shown for example in U.S. Pat. Nos. 4,819,159 and 5,155,845, or software, as shown for example in U.S. Pat. No. 5,165,031. Such redundancy techniques are necessarily more expensive and more complicated and, hence, are only desirable in those situations where data integrity is of the utmost importance for a particular computer processing system.

In a UNIX® System V file system, the problem of control information integrity in the event of an unscheduled hard stop is especially acute. Unlike DOS-based systems which write control information only to the secondary storage devices, the file control information in a System V-based file system is cached in memory thereby increasing the access latency window between the updating of the control information and the writing of the updated control information to the more permanent secondary storage device. In addition, System V-based file systems lack standard sync points for writing control information, thereby creating multiple indeterminate windows of opportunity for corruption of the control information of the file structure.

In order to recover from the possible corruption of control information, the System V-based file systems use an fsck command that verifies the control information and the directories in the file system after an unscheduled hard stop. The fsck command bypasses the standard file access methods and compares the directory and control information in an effort to identify any disk blocks or control structure known as inodes that are not accounted for within the file system. For example, if there are inodes that are set to indicate associated files but no file name entries appear to exist, the fsck command identifies these files in a lost and found directory for the system administrator to identify and repair. It will be apparent that the repairing of files in the lost and found directory can be a time and labor intensive process. In another example, if there are file entry names in a directory that are not associated with an inode, the fsck command "repairs" the inconsistency simply by eliminating the file. Another disadvantage of using the fsck command is that it can be a time and processor intensive task to recovery from an unscheduled hard stop if there are a large number of files and inodes to compare. In addition, the fsck command provides no redundancy checking and lacks any mechanism to pinpoint the occurrence of the unscheduled hard stop.

The problem of file integrity in the event of an unscheduled hard stop is compounded for data servers storing remote files for a distributed network environment where the remote file systems may be accessed by any number of user nodes on the network. In this situation, not only is the access latency increased due to the fact that the remote files must be transferred across the network to the data server, but the possibility of multiple users accessing the same remote file must also be taken into account. In such a distributed network environment, it is also more difficult to implement traditional logging or redundancy techniques for insuring file integrity because of the lack of a central controller to implement file recovery procedures. The demands of file availability on the network may also preclude the time that would otherwise be required to insure file integrity in the event of an unscheduled hard stop of a network data server if traditional transactional log recovery or fsck procedures are used to recover and verify the remote file systems stored on the data server.

Correspondingly, the problem of control information integrity is also compounded for remote files stored in a distributed network environment and accessed by any number of users on the network. Control information may be cached in multiple locations thereby increasing the frequency and duration of the access latency windows and opportunities for control information corruption. Multiple user nodes may be accessing file inodes or directories at any given time, exponentially increasing the possibility of inconsistencies existing after an unscheduled hard stop of the file system.

Although conventional techniques for file recovery are adequate for recovering local files stored on secondary storage systems directly connected to a computer processing system, such techniques are not well suited to handle file recovery for data servers in a distributed computer network environment. Consequently, it would be advantageous to provide a method and apparatus for file recovery for secondary storage systems that was capable of insuring data integrity of control information and providing for fast and reliable data recovery of files stored on secondary storage systems, including remote files stored on networked data servers upon restart after an unscheduled hard stop.

SUMMARY OF THE INVENTION

The present invention is a method and apparatus for backing up the control information of a file system for a secondary storage system in such a way so as to provide for a fast and reliable recovery of the file system in the event of an unscheduled hard stop of a computer processing system. The file system utilizes control information that is maintained in a cache memory of the computer processing system and a copy of the control information is periodically backed up to two separate logical devices in the secondary storage system. As part of each backup, a control stamp value unique to each iteration of the backup is written to a pair of unique control stamp locations on the logical devices, one control stamp location being written prior to the back up of the control information and the other control stamp location being written after the backup of the control information. In the event of an unscheduled hard stop of the computer processing system, the control information for the file system is quickly and accurately recovered by determining which of the two copies of the control information is accurate based on a comparison of the control stamp values in all four control stamp locations.

The present invention can guarantee that the copies of the control information backed up to the pair of logical devices are not corrupted by only allowing control information on the logical devices to be updated at certain site-selectable sync points initiated by the operating system program. In this way, no matter when an unscheduled hard stop of the computer processing system occurs, at least one copy of the control information will not be in a transient or update process as of the time of the hard stop. As a result, the recovery of the file system is a relatively simple and relatively fast process involving the determination of which of the two copies of the control information is accurate based on a deduction of when the unscheduled hard stop occurred during the ongoing periodic backup of control information.

In the preferred embodiment, the file system is a System V-based file system. The logical devices are a physically unique pair of disk drives and the unique control stamp value for each iteration of the backup is generated using a time clock or time stamp value. The backup of the control information is also accomplished in a unique manner so as to preclude the possibility of corruption of the control information. During each of the two backups at each sync point, the released inode numbers are first merged into or freed up in the inode allocation mechanism of the file control structure and then copied to the disk drive. Next, the released blocks are merged into or freed up in the block allocation mechanism of the file control structure and then copied to the disk drive. Finally, the directory information for the file structure is copied to the disk drive.

Accordingly, it is a primary objective of the present invention to provide a fast, efficient file recovery system for file servers operating in a computer processing system which caches file control information in memory before writing the control information to a secondary storage device.

It is another objective to maximize reliability and redundancy of control information with a minimum of hardware and software resources.

It is a further objective of this invention to provide a continuous, periodic method to update control information for a file system while minimizing inconsistencies in the file system in the event of an unscheduled hard stop of the computer processing system.

It is a still further object of this invention to provide a method and apparatus for file recovery for secondary storage systems that was capable of insuring data integrity of control information and providing for fast and reliable data recovery of files stored on secondary storage systems after an unscheduled hard stop.

These and other objectives of the present invention will become apparent with reference to the drawings, the detailed description of the preferred embodiment and the appended claims.

DETAILED DESCRIPTION OF THE PREFERRED EMBODIMENT

The preferred embodiment of the present invention is implemented in distributed computer network environment executing a UNIX®-compatible operating system program and including a System V-based file system which includes a data portion and control information or inode for each file. For a more detailed description of the System V-based file system, reference is made to *The Design of the UNIX™ Operating System* by Maurice J. Bach (1986). It will be recognized, however, that the present invention is capable of use with any type of file system for a secondary storage system where updated control information is cached prior to being written to a secondary storage device.

Figure 2:
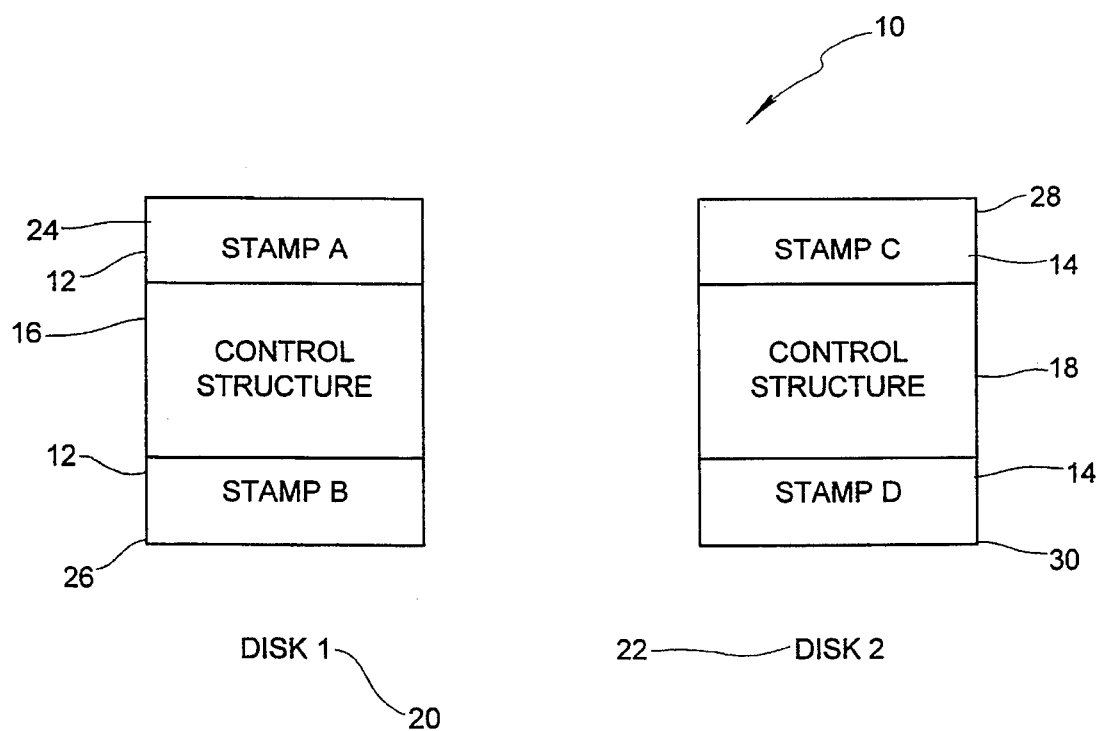
FIG. 2 is a overall block diagrams showing the structure of the preferred embodiment of the file recovery mechanism of the present invention.

Referring to FIG. 2, in the preferred embodiment of the present invention, the file recovery apparatus 10 includes one or more control stamp sets 12, 14, one or more control information structures 16, 18 for each file, one or more secondary storage devices 20, 22 and a timing device (not shown). Those skilled in the art will understand that the timing device may be any electronic clock common to computer processing systems. The control sets 12, 14 each include a start control stamp 24, 28 (designated A and C respectively) and an end control stamp 26, 30 (designated B and D respectively). In the preferred embodiment, the control stamps 24, 26, 28, 30 have the same value. For ease of reference, the secondary storage devices 20, 22 are referred to as a first disk 20 and a second disk 22 though those skilled in the art will recognize that a secondary storage device may be, for example, a tape drive, optical disk drive or jukebox or hard disks.

In operation, in the preferred embodiment, the timing device provides site-selectable sync points for coordinating the writing of updated control information from the memory cache to the control information structures 16, 18 stored on the secondary storage devices 20, 22 and coordinates the release of allocated inodes and blocks. In addition to the sync points, the update of the control information from the memory cache to the secondary storage devices 20, 22 can also be forced by the file control program under certain conditions, such as table overflows of the inode release table or the block release table, or in the event of an interrupt sensing loss of AC power, for example.

Figure 1:
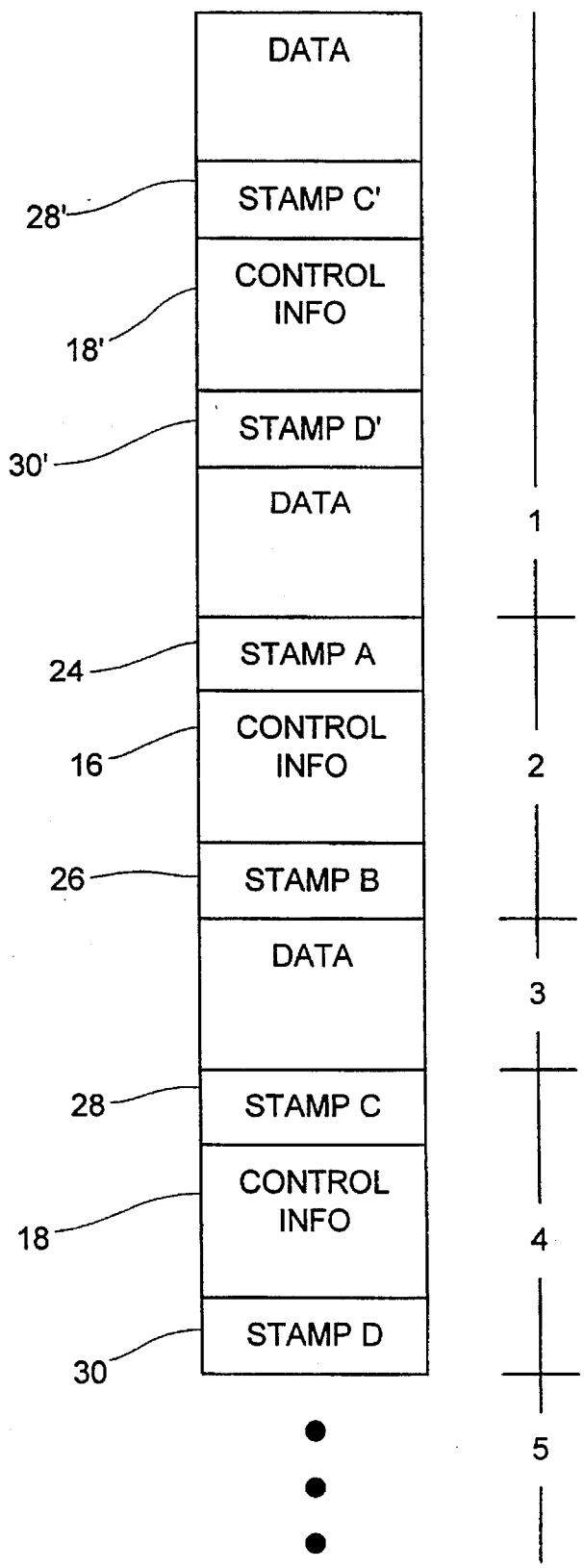
FIG. 1 is an timing diagram showing the preferred embodiment of the file recovery mechanism of the present invention.
Figure 3:
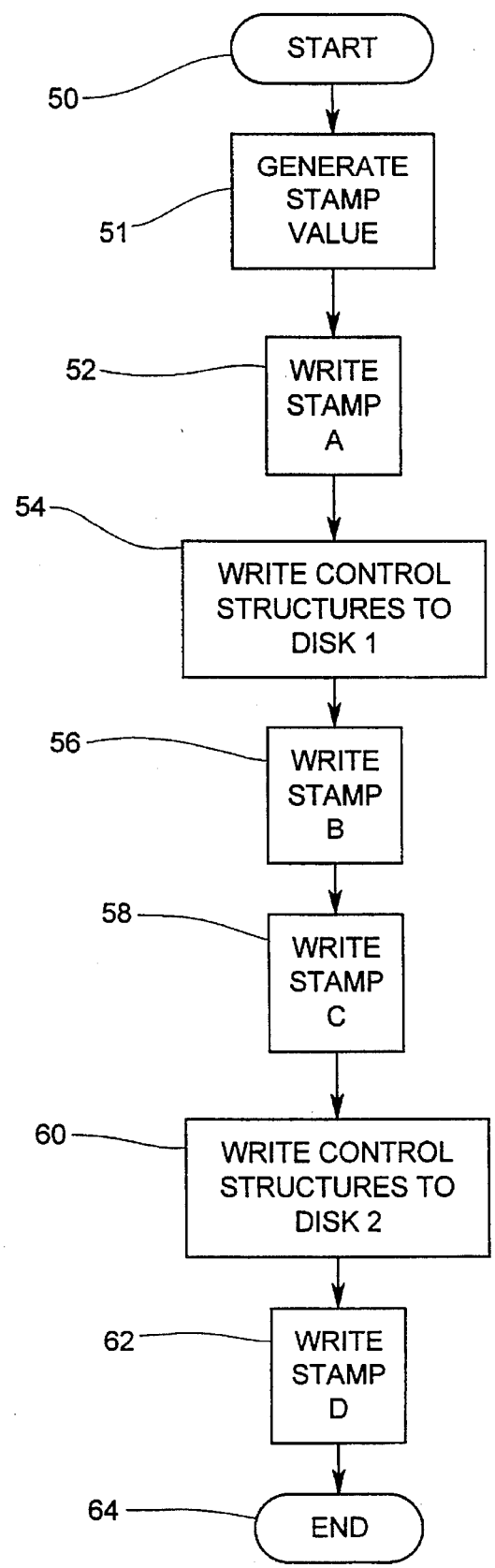
FIG. 3 is a flow chart of the preferred embodiment of the method for writing the file recovery mechanism to the secondary storage device.

Referring to FIGS. 1 and 3, the method for utilizing the file recovery apparatus 10 in accordance with the present invention begins once the sync point is reached (step 50). The file system first generates a control stamp value (step 51) and then writes control stamp value to the start control stamp 24 on the first disk 20 (step 52). The file system then writes the control information to the control structure 16 on the first disk 20 (step 54) and writes the control stamp value to the end control stamp 26 on the first disk 20 (step 56).

The file system then "shadows" the control set 12 and control information on the first disk 20 on the second disk 22 (steps 58–62) by making another copy of the information. Specifically, the file system writes the control stamp value to the start control stamp 28 on the second disk 22 (step 58) and then writes the control information to the control structure 18 on the second disk 22 (step 60). The file system writes the control stamp value to the end control stamp 30 on the second disk 22 (step 62) and ends (step 64). With reference to the previously identified co-pending application, a control set 12 of control stamps 24, 26 are described as File Tree Time Stamps stored in the Super Block for File Tree and depicted in FIG. 5 of the previously identified co-pending application. The file system repeats this process (steps 50–64) to continually update the control information stored in the control structures 16, 18 on the disks 20, 22.

Figure 4:
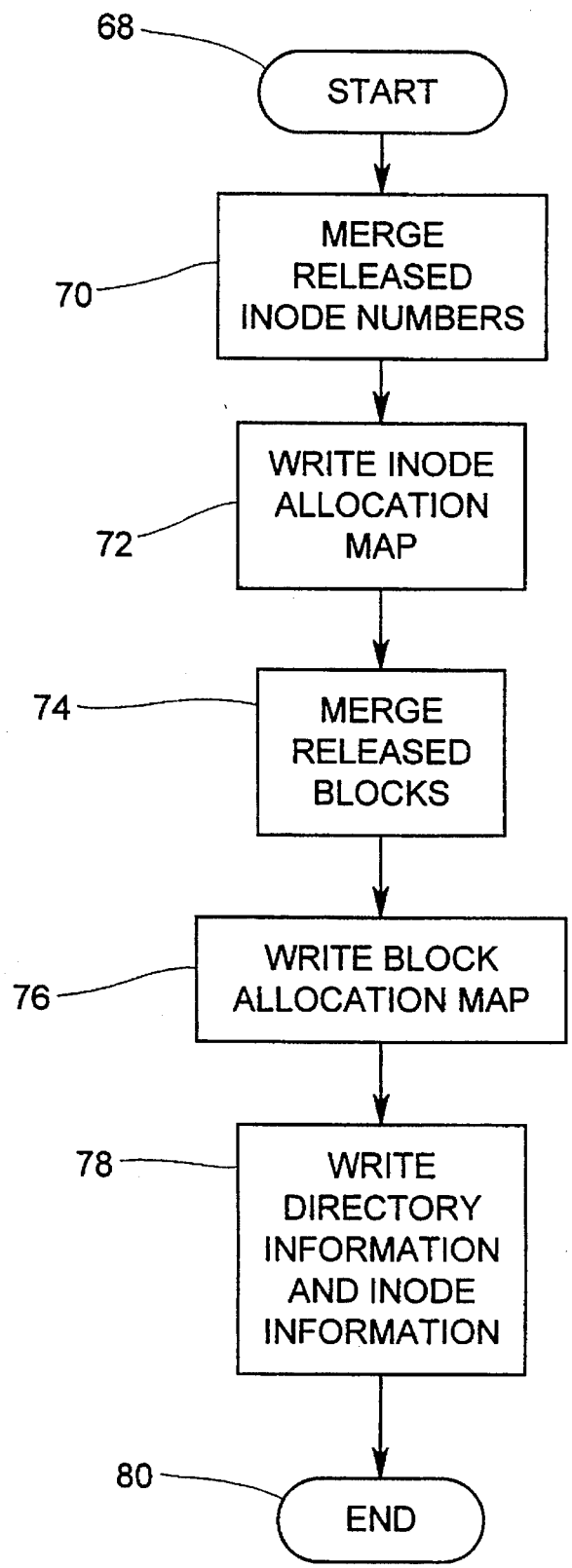
FIG. 4 is a flow chart of the updating the control information in accordance with the present invention.

Referring to FIG. 4, the preferred embodiment for updating the control structures as shown in steps 54 and 60 of FIG. 3 will be described. The sync point specified for the System V-based operating system program provides the starting point (step 68) for the updating of the control structures in the preferred embodiment. The first step of the update process (step 72) is to merge the released inode numbers from the inode allocation mechanism. As described in the previously identified co-pending application, the allocation mechanism for inodes in the preferred embodiment is an inode allocation bit map, although it will be understood that other allocation methods such as table or link lists could also be used. The update allocation bit map is then written to the disk (step 72). The released disk blocks are then merged into the disk block allocation mechanism (step 74). Again, the preferred embodiment uses a disk block allocation bit map, but other allocation methods would work equally as well with the present invention. The updated disk block allocation mechanism is written to the disk (step 76). Finally, the updated directory information and updated inode information is written to the disk (step 78). Once all of the control information has been written from the cache to the disk, the sync point is complete (step 80) and no control information will be changed or written onto the disk until the next sync point.

By not releasing allocated inodes and blocks until the control information is updated at the sync points reduces the potential conflicts between free and allocated inodes and blocks occurring due to corrupted control information. By writing the inode allocation mechanism to the disk first, the preferred embodiment prevents the unwanted condition of having an inode structure point to a disk block which has already been released. By writing the directory information last, the preferred embodiment also prevents the unwanted condition of having a directory entry that points to disk blocks or inode structures that are incorrect.

Figure 5:
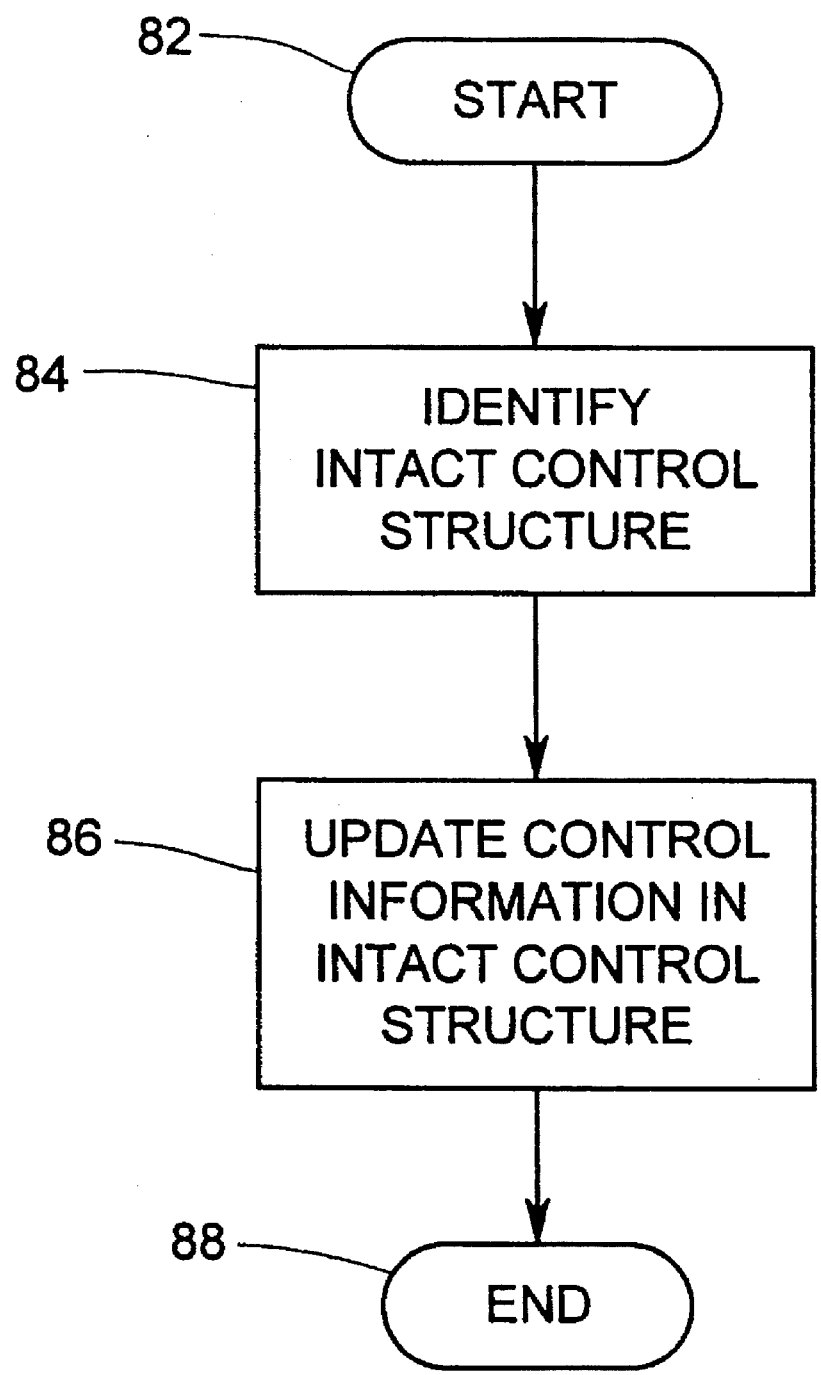
FIG. 5 is a flow chart showing the preferred embodiment of the method of file recovery in accordance with the present invention.

Referring now to FIG. 5, in the event of an unscheduled hard stop, the file recovery method in accordance with the present invention begins by identifying an intact control structure (steps 82, 84), resets the control information in the cache to be consistent with an intact control structure (step 86) and ends (step 88). Those skilled in the art will recognize that standard data recovery techniques can be used to recover data lost once reliable control information is identified.

Figure 6:
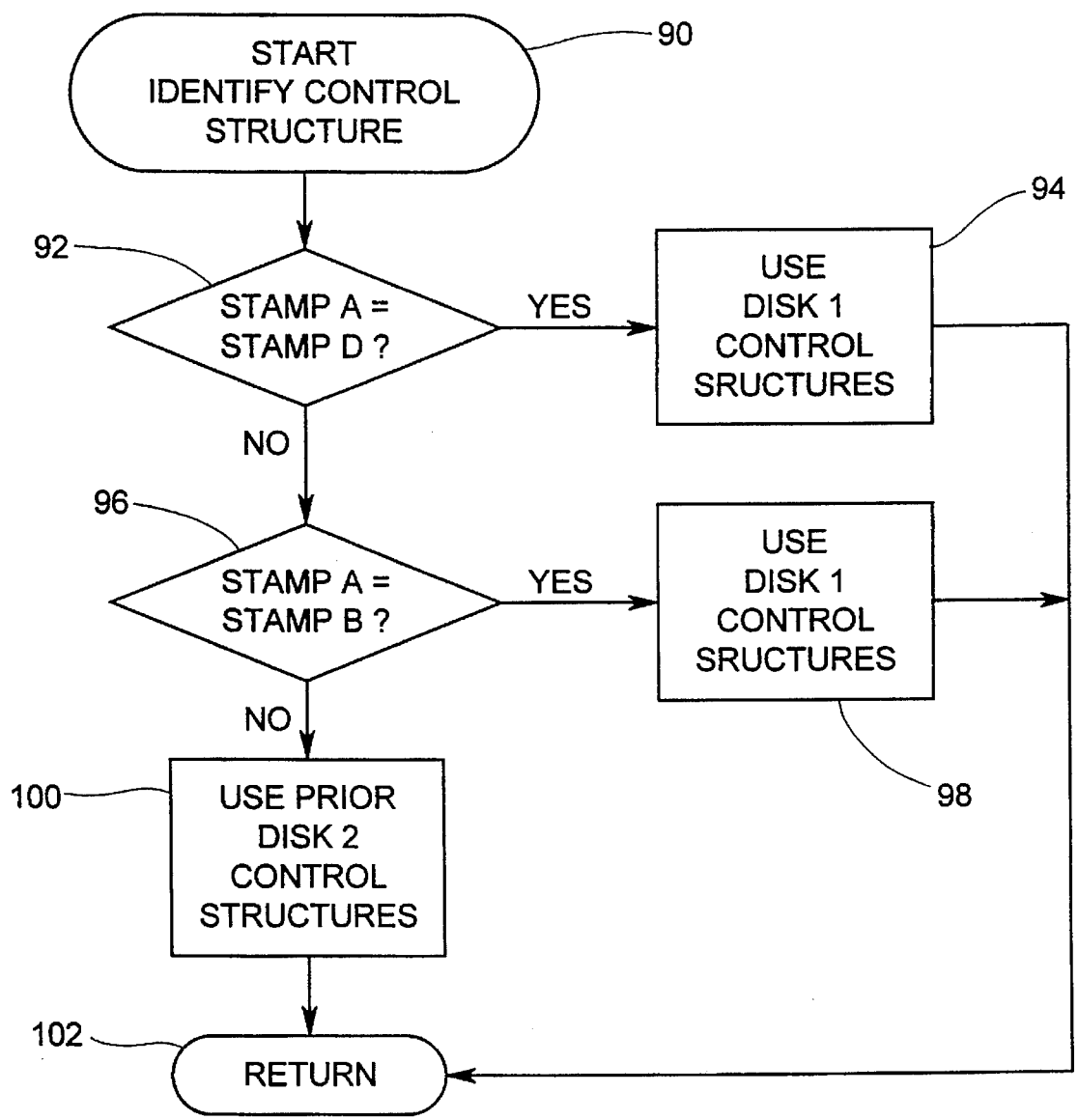
FIG. 6 is a flow chart depicting the select intact control structure step of FIG. 5 in greater detail.

Referring to FIGS. 1 and 6, the identification step (step 84) of FIG. 5 begins by testing whether the value of the start control stamp 24 on the first disk 20 is equivalent to the value of the end control stamp 30 on the second disk 22 (steps 90, 92). If the start control stamp 24 is equivalent to the end control stamp 30, then the control structure 16 is intact and should be used (step 94) and the identification step returns (step 102). Referring to FIG. 1, if the control stamps 24 and 30 are equivalent, then the control information written to the control structure 16 was not corrupted during the unscheduled hard stop and therefore is reliable. By inference, in this situation, the unscheduled hard stop must have occurred sometime in period 5.

If the start control stamp 24 is not equivalent to the end control stamp 30, then the file system tests whether the value of the start control stamp 24 on the first disk is equivalent to the value of the end control stamp 26 on the first disk 20 (step 96). If the start control stamp 24 is equivalent to the end control stamp 26, then the control structure 16 is intact and should be used (step 98) and the identification step returns (step 102). Referring to FIG. 1, if the control stamps 24 and 26 are equivalent, then the control information written to the control structure 16 was not corrupted during the unscheduled hard stop and therefore is reliable. By inference, in this situation, the unscheduled hard stop must have occurred sometime during periods 3 or 4.

If the start control stamp 24 is not equivalent to the end control stamp 26, then the control information stored in the control structure 18 on the second disk 22 and bracketed in time by the prior start control stamp 28' and prior end control stamp 30' is intact and should be used (step 100) and the identification step returns (step 102). Referring to FIG. 1, if control stamp 24 and control stamp 26 are not equivalent, the unscheduled hard stop must have occurred during period 2 and so the information in the control structure 16 bracketed by the start control stamp 24 and end control stamp 26 has been corrupted and should not be used. Therefore, the intact control structure is the control structure 18' written prior to the updated control structure 16.

The use of the sync points to update control information and generate the control stamps 24, 26, 28, 30 allows the file system to generally pinpoint the timing of the unscheduled hard stop to a particular period and thus more accurately and quickly determine the actual status of control information and data at the time of the unscheduled hard stop. Determining the actual status of the control structures and data at the time of the unscheduled hard stop eliminates the need to trace each file in the system through a transaction log to insure its proper linkage during recovery and reduces the time required to reset control information, especially in large distributed network systems with many files and user nodes. In addition, the use of more than one secondary storage device in the preferred embodiment of the present invention provides redundancy and enhances reliability of the control information.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. In a computer processing system including a file system for storing data on a secondary storage system connected to the computer processing system, the file system having control information that is maintained in a cache memory and periodically backed up to the secondary storage system, a method for backing up control information stored on the secondary storage system that provides for fast and reliable recovery of the file system in the event of an unscheduled hard stop of the computer processing system, the method comprising the computer-implemented steps of:

(a) for each periodic iteration of backing up the control information for the file system, performing the steps of:
   (a1) generating a unique control stamp value for this iteration of the backup;
   (a2) writing the control stamp value to a first control stamp location on a first logical device in the secondary storage system;
   (a3) writing a first copy of the control information for the file system to a control information location on the first logical device;
   (a4) writing the control stamp value to a second control stamp location on the first logical device;
   (a5) writing the control stamp value to a third control stamp location on a second logical device in the secondary storage system;
   (a6) writing a second copy of the control information for the file system to a control information location on the second logical device;
   (a7) writing the control stamp value to a fourth control stamp location on the second logical device;

(b) in the event of an unscheduled hard stop of the computer processing system, recovering control information for the file system by performing the steps of:
   (b1) comparing the control stamp value in the first control stamp location to the control stamp value in the fourth control stamp location;
   (b2) if the control stamp value in the first control stamp location is equal to the control stamp value in the fourth control stamp location, then using the first copy or the second copy of the control information for the file system on the first logical device to recover the file system as both copies of the control information are uncorrupted;
   (b3) if the control stamp value in the first control stamp location is not equal to the control stamp value in the fourth control stamp location, then comparing the control stamp value in the first control stamp to the control stamp value in the second control stamp location;
   (b4) if the control stamp value in the first control stamp location is equal to the control stamp value in the second control stamp location, then using the first copy of the control information for the file system on the first logical device to recover the file system as the second copy of the control information may be corrupted;
   (b5) otherwise using the second copy of the control information for the file system on the second logical device to recover the file system as the first copy of the control information may be corrupted.

2. The method of claim 1 wherein the file system further includes a data server operating under a System V-compatible operating system in a distributed processing network environment.

3. The method of claim 1 wherein step (a1) generates the control stamp value from a value of a local clock of the computer processing system.

4. The method of claim 1 wherein the secondary storage system includes a plurality of disk drives and the first logical device and the second logical device are physically unique ones of the disk drives.

5. The method of claim 1 wherein each iteration of step (a) occurs on a continuing periodic site-selectable basis as part of a sync point operation performed by an operating system program of the computer processing system.

6. The method of claim 5 wherein steps (a3) and (a6) each include the steps of:

(c1) merging any inodes that have been released since a previous sync point into an inode allocation mechanism of the control information of the file system and writing the inode allocation mechanism to the logical devices;

(c2) merging any logical blocks that have been released since the previous sync point into a logical block allocation mechanism of the control information of the file system and writing the block allocation mechanism to the logical devices;

(c3) writing any directory files that have been changed since the previous sync point to the logical devices; and (c4) writing any inodes that have been changed since the previous sync point to the logical devices.

7. The method of claim 4 wherein steps (c3) and (c4) are performed by contemporaneously marking any blocks of the control information in the cache memory as they are updated as dirty buffers, writing the dirty buffers to the logical devices at the sync point and then unmarking those buffers.

8. In a computer processing system including a file system for storing data on a secondary storage system connected to the computer processing system, the file system having control information that is maintained in a cache memory, an apparatus for backing up the control information to the secondary storage system comprising:

means for initiating a periodic backup of the control information from the cache memory to the secondary storage system, including means for generating a unique control stamp value for each iteration of the periodic backup;

means for backing up a first and second copy of the control information to a first and second logical storage device, respectively, in the secondary storage system in response to the means for initiating a periodic backup, including:

means for writing the unique control stamp value to a first control stamp location on the first and second logical storage devices, respectively, prior to backing up the first and second copy of the control information; and means for writing the unique control stamp value to a second control stamp location on the first and second logical storage devices, respectively, after backing up the first and second copy of control information;

recovery means for recovering the control information backed up on the secondary storage system in the event of an unscheduled hard stop of the computer processing system by determining which of the first and second copies of the control information is accurate in using that copy of the control information to recover the file system wherein the recovery means determines which of the first and second copies of the control information is accurate according to the following conditions:

if the control stamp value in the first control stamp location is equal to the control stamp value in the fourth control stamp location, then using either the first copy or the second copy of the control information for the file system on the first logical device to recover the file system;

if the control stamp value in the first control stamp location is not equal to the control stamp value in the fourth control stamp location and the control stamp value in the first control stamp location is equal to the control stamp value in the second control stamp location, then using the first copy of the control information for the file system on the first logical device to recover the file system;

otherwise using the second copy of the control information for the file system on the second logical device to recover the file system.

9. The apparatus of claim 8 wherein the apparatus is part of a data server operating under a System V-compatible operating system in a distributed processing network environment.

10. The apparatus of claim 8 wherein the unique control stamp value is generated from a value of a local clock of the computer processing system.

11. The apparatus of claim 8 wherein the secondary storage system includes a plurality of disk drives and the first logical device and the second logical device are physically unique ones of the disk drives.

12. The apparatus of claim 8 further comprising:

sync means for preventing updating of any of the control information from the cache memory to the secondary storage system other than during one of the periodic or forced backups of the control information.

13. The apparatus of claim 12 wherein the means for backing up the first and second copy of the control information includes:

means for merging any inodes that have been released since a previous sync point into an inode allocation mechanism of the control information of the file system and writing the inode allocation mechanism to the logical devices;

means for merging any logical blocks that have been released since the previous sync point into a logical block allocation mechanism of the control information of the file system and writing the block allocation mechanism to the logical devices;

means for writing any directory files that have been changed since the previous sync point to the logical devices; and means for writing any inode information that has been changed since the previous sync point to the logical devices.

14. The apparatus of claim 13 wherein the means for writing any directory files and the means for writing any inode information are accomplished by contemporaneously marking any blocks of the control information in the cache memory as they are updated as dirty buffers, writing the dirty buffers to the logical devices at the sync point and then unmarking those buffers.

* * * * *